June 9, 1953
C. F. POLLEN
2,641,207
FURNACE ARCH CONSTRUCTION
Filed Dec. 6, 1948
3 Sheets-Sheet 1
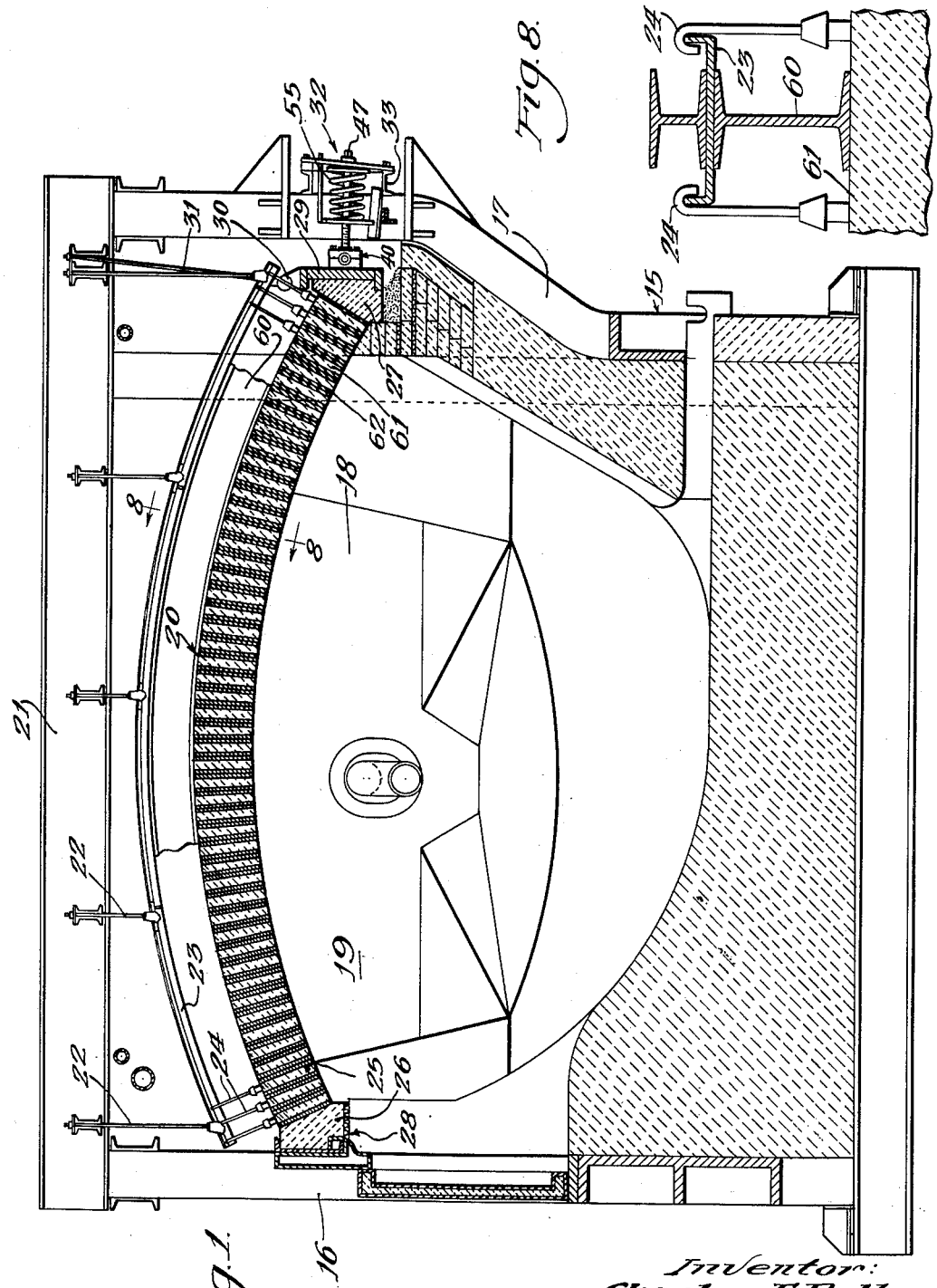
Inventor:
Charles F. Pollen
By: Zabel & Gitzbaugh
Attorneys

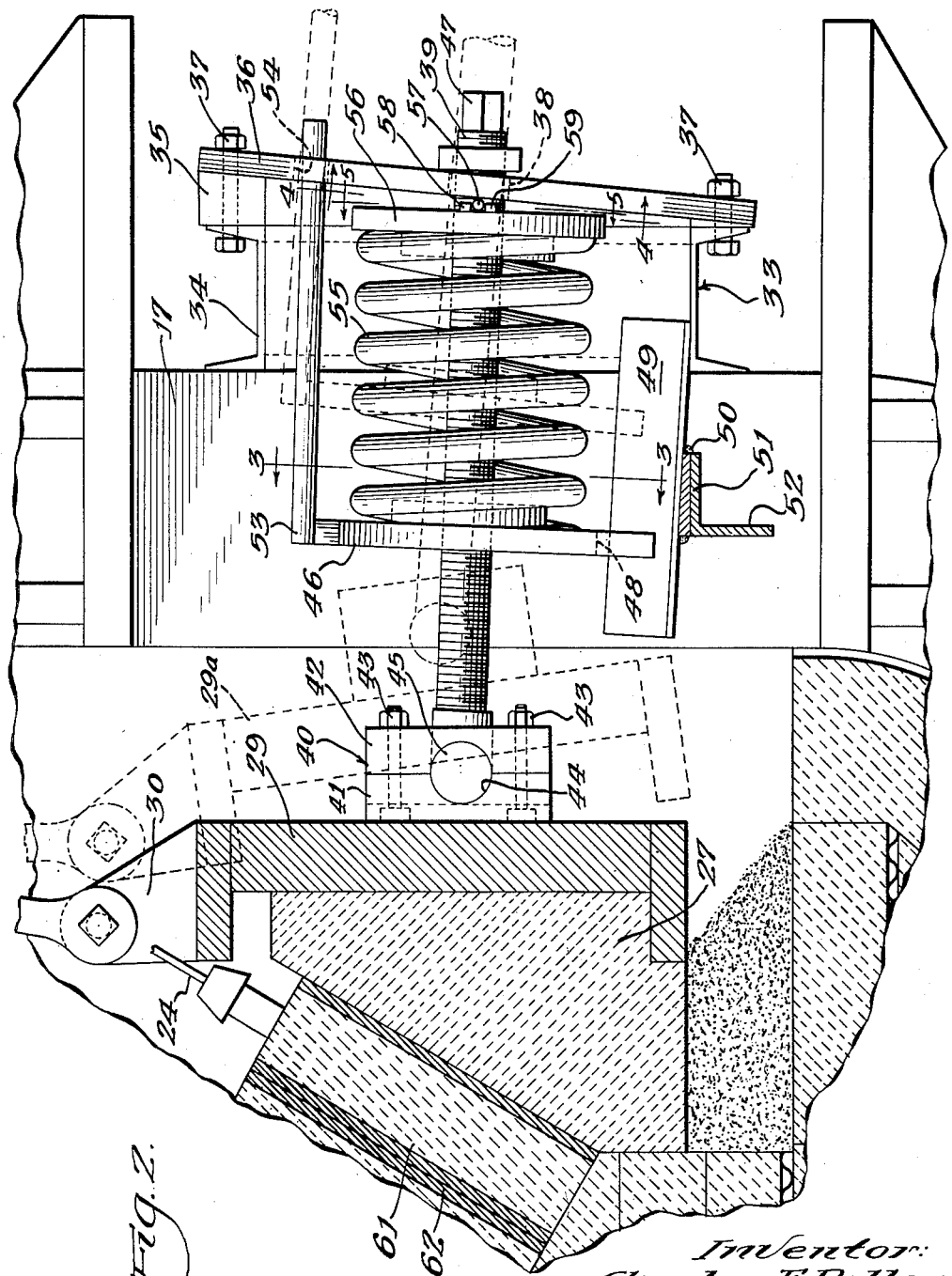

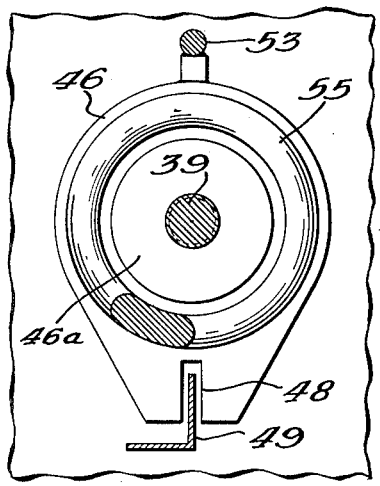
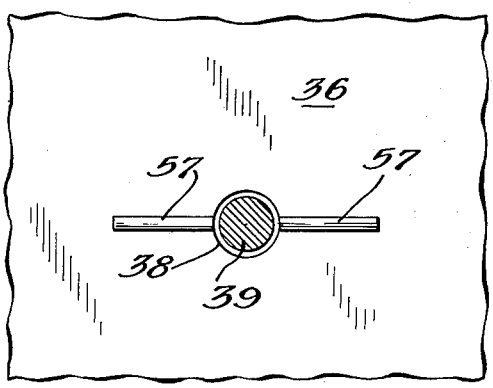
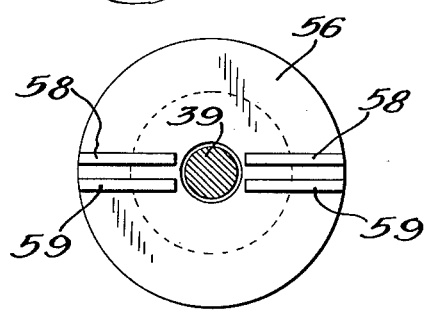
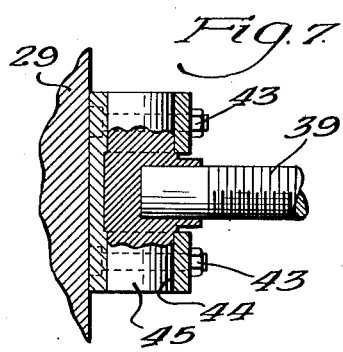
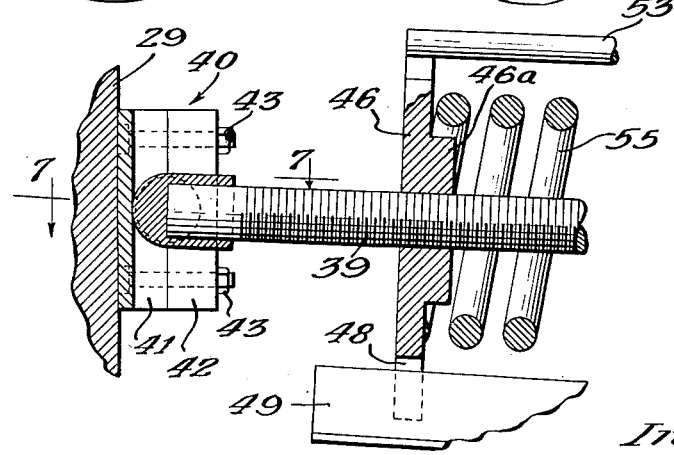

Patented June 9, 1953

2,641,207

UNITED STATES PATENT OFFICE 2,641,207

FURNACE ARCH CONSTRUCTION

Charles F. Pollen, Winnetka, Ill., assignor to M. H. Detrick Company, Chicago, Ill., a corporation of Delaware Application December 6, 1948, Serial No. 63,815

4 Claims. (Cl. 110—99)

The present invention relates to arched roof constructions in furnaces and is intended to solve a problem that has long existed in this type of structure.

The invention is primarily intended for use in a furnace arch construction that employs a plurality of elements arranged side by side, each element comprising a basic or non-acidic brick contained in a steel shell that provides steel side plates between adjoining bricks. During normal use of the furnace these bricks are subjected to thermal expansion during their initial heating in the furnace as is customarily true with all bricks used in furnace arch constructions. Provisions have been made in the past for accommodating the structures for this thermal expansion as shown for example in the United States patent to Stevens No. 1,534,472, dated April 21, 1925. This thermal expansion is merely temporary and represents a rather fixed maximum growth in the overall width of the furnace arch that can be readily calculated and which is never exceeded by virtue of the thermal expansion alone. The present invention is not concerned with this type of expansion because devices such as that disclosed in the Stevens patent are very satisfactory for compensating for these limited changes in the overall dimension of the furnace roof.

In addition to this normal thermal expansion taking place in the furnace roof there is an additional overall growth of a permanent nature that continues over a long period of time and presents a real problem. The steel plates disposed between the basic brick material in the structure disclosed in this present application oxidize during normal operation of the furnace, causing the overall width of the furnace arch to expand. There are two explanations for this expansion. In the first place, the iron oxide resulting from the oxidation process utilizes a greater volume than the iron in the original metallic state in the steel, and consequently the steel plates composed of some iron oxide required greater space between the bricks than is required by the steel plates prior to the formation of the oxide. The second cause of the overall growth in the width of the arched roof is the growth in the basic brick portion of the brick element due to the absorption by the basic brick of a certain amount of the iron oxide. This growth resulting from this oxide formation represents a permanent change in the overall dimension of the furnace arch and is not merely a change in dimension within certain known fixed limits.

As an example of this growth a furnace arch twenty feet wide has been known to grow in width as much as one-half inch to an inch per month during normal use of the furnace. For purposes of the present invention it can be assumed that the normal thermal expansion is compensated for by any of the well-known means.

The growth in the structure resulting from the formation of the iron oxide takes place most rapidly on the face of the brick that is exposed to the heat of the furnace and as the heating of the brick penetrates further into the brick structure, the growing tendency resulting from the formation of the oxide also penetrates deeper into the brick structure. This uneven growth between the inner and outer faces of the structure results in the opening up the joints of the brick and the plate where dirt and other foreign material utilizes additional space and represents another cause for the increase in the width of the arch.

The present invention compensates for this overall growth by permitting the arch to expand while at the same time maintaining a relatively constant pressure between the bricks irrespective of the total amount of growth taking place. This is found to be very important because the basic brick itself has a tendency to spall and excessive pressures exerted on the bricks aggravate this spalling condition. It has been found that the life of furnace roofs can be greatly extended when the device of the present invention is utilized and the cost of maintenance greatly reduced.

The present invention functions efficiently and yet is simple and inexpensive both from the point of view of construction and maintenance.

The foregoing constitute some of the principal objects and advantages of the present invention, others of which will become apparent from the following description and the drawings, in which Fig. 1 is a vertical, sectional view through a furnace embodying the present invention;

Fig. 2 is an enlarged fragmentary, vertical, sectional view through one end of the arched roof of the furnace;

Fig. 3 is a vertical sectional view taken along the line 3—3 of Fig. 2;

Fig. 4 is a vertical sectional view taken along the line 4—4 of Fig. 2;

Fig. 5 is a vertical sectional view taken along the line 5—5 of Fig. 2;

Fig. 6 is a fragmentary, longitudinal, sectional view through one end of the yieldable device illustrated in Fig. 2;

Fig. 7 is a fragmentary, horizontal, sectional view taken along the line 7—7 of Fig. 6; and Fig. 8 is a fragmentary, sectional view through the furnace arched roof, the view being taken along the line 8—8 of Fig. 1.

For purposes of illustration one embodiment of the present invention is shown in the drawings and will be described hereinafter, though it is recognized that many modifications may be made in the embodiment shown without departing from the intended scope of the invention.

Referring now to Fig. 1 of the drawings the invention is illustrated as applied to a furnace generally indicated at 15 that includes a front wall 16, a rear wall 17 and a pair of side walls, one of which is shown at 18. Inside the furnace is a combustion chamber 19 over which is disposed an arched roof generally indicated at 20 that embodies the present invention.

Spanning the top of the furnace are a plurality of I-beams, one of which is shown at 21, that are supported at their opposite ends by the front and rear walls 16 and 17 of the furnace. Suspended from these I-beams 21 are a plurality of hangers 22 that carry on their lower ends an arched supporting member 23. Suspended from each of the arched supporting members 23 are a plurality of hangers 24 to the free end of each of which is suspended a brick unit generally indicated at 25. As can be seen in Fig. 1 these brick units 25 are disposed side by side to form an arch that extends from the front to the rear of the furnace, the forwardmost brick unit 25 resting against a front supporting block 26 and the rearwardmost brick unit 25 resting against a rear supporting block 27. The forward supporting block 26 is rigidly held in place on suitable supporting structure generally indicated at 28 while the rear supporting block 27 is attached to a channel frame 29 that is pivotally supported as at 30 to the free ends of hangers, one of which is illustrated at 31 in Fig. 1. The hangers 31 in turn are suspended from the I-beams 21. Thus the channel frame 29 is movably mounted to swing with the hangers 31.

The channel frame 29 is yieldably held in place by means of a plurality of backing devices, one of which is illustrated at 32. This yieldable device (see Fig. 2) is mounted in a framework generally indicated at 33 that includes channel members 34 that are fixed to the rear wall 17 of the furnace and a wedge shaped frame member 35. Against this wedge shaped member 35 is disposed a fixed plate 36 and this plate 36 together with the wedge shaped member 35 are fixed to the framework 33 by means of bolts 37. The fixed plate 36 is apertured as at 38 at its center to receive a threaded shaft 39, the diameter of the shaft 39 being somewhat less than the diameter of the aperture 38 so that the shaft is entirely free in the aperture. The inner end of the shaft 39 is secured to the channel frame 29 by an attaching member 40. This attaching member 40 includes a pair of blocks 41 and 42 that are clamped together by means of bolts 43. The blocks 41 and 42 together are grooved to form a cylindrical aperture 44 that is adapted to receive a cylindrical shaft 45 to which the free end of the threaded shaft 39 is attached as best shown in Figs. 6 and 7.

Threaded onto the shaft 39 is an adjustable plate 46 best shown in Figs. 2, 3 and 6, that is adapted to move back and forth along the threaded shaft 39 when the latter is rotated about its longitudinal center. The end of the shaft 39 is adapted to rotate in the cylindrical shaft 45 shown in Fig. 7. The opposite end of the shaft 39 is provided with a square or hexagonal head portion 47 that is adapted to accommodate a socket wrench or the like. Thus by applying the socket wrench onto the head 47 of the threaded shaft 39 and turning the latter shaft, the movable plate 46 is caused to move along the length of the threaded shaft 39 toward one end or the other depending upon the direction of rotation of the shaft. The lower end of the movable plate 46 is notched as at 48 (see Fig. 3) to fit over an upstanding angle bar 49 (see Figs. 2 and 3), which in turn is welded as at 50 to a plate 51 and an angle member 52 forming part of the furnace wall structure. Thus the angle bar 49 serves as a guideway along which the movable plate 46 travels, and also prevents turning of the movable plate 46 about the threaded shaft 39. To the upper end of the movable plate 46 is secured a guide rod 53 that extends rearwardly from the movable plate 46 and passes through an aperture 54 in the fixed plate 36.

Mounted between the movable plate 46 and the fixed plate 36 is a compression spring 55 that is seated at one end on a boss 46a (see Fig. 6) that is formed on the inner face of the movable plate 46 and at the other end on a spring seat plate 56 that is mounted concentrically about the threaded shaft 39. The aperture in the plate 56 is sufficiently larger in diameter than the diameter of the threaded shaft 39 so that the shaft 39 can rotate freely in the seat plate 56. The inner face of the fixed plate 36 is provided with inwardly projecting ribs 57 that are aligned. The spring seat plate 56 is provided with a pair of spaced sets of ribs 58 and 59, each set comprising one rib 58 and one rib 59 vertically spaced apart to accommodate therebetween one of the ribs 57 on the fixed plate 36 (see Fig. 2). Thus the spring seat plate 57 is prevented from rotating about the threaded shaft 39 by cooperation between the ribs 57, 58 and 59.

Again referring to Fig. 1 each of the brick units 25 comprises a steel shell that houses a basic brick 61. The side walls of the steel housing provide plates 62 separating the adjoining basic brick portion 61.

During normal operation of the furnace 15 iron oxide is formed on the steel plates 62 which tends to move adjacent brick units 25 away from each other, creating a crowded condition between the brick units throughout the entire width of the arch. Initially when the furnace is first constructed, proper compression as between the bricks is provided by the compression spring 55 that backs up the channel frame 29. The formation of the iron oxide increases this initial compression between the brick units 25 causing the channel frame 29 to swing for example to the broken line position 29a, illustrated in Fig. 2, but in so doing the spring 55 yields and is placed under rather substantial compression. The effect of this operation provides an actual elongation in the width of the arched roof of the furnace. It is apparent that it becomes necessary to compensate for this elongation by returning the compression spring substantially to its initial condition for otherwise the spring fails to yield to the same degree of force as it becomes more and more compressed so that the pressure between the brick units 25 becomes greater and eventually excessive. To prevent this condition the threaded shaft 39 is rotated as previously described by the use of a wrench on the head 47 so as to move the movable plate 46 linearly along the shaft, thereby changing the position of one of the seats for the spring 55. When this plate 46 is moved away from the fixed plate 36 at the other end of the spring it is apparent that the compression in the spring is released, whereas the opposite condition exists when the movable plate 46 is moved in the opposite direction with respect to the fixed plate 36. Thus by periodically moving the movable plate 46 away from fixed plate 36 the compression in the spring 55 can be maintained at a more or less normal condition as the arched roof 20 grows, resulting in a substantial uniform pressure condition between the brick units 25.

Between the top of the course of bricks illustrated in Fig. 1 and the arched supporting member 23 is a hold-down member 60 that is shown in Figs. 1 and 8 to be in the form of an I-beam, though, of course, the shape of this member is immaterial. The function of the hold-down member 60 is to prevent upward movement of any of the individual brick units 25 making up the course of bricks that span the furnace to form the roof.

As previously mentioned the bottom chord of the arched roof 20, being exposed to the direct heat of the furnace, is subject to a more rapid formation of acid than the upper chord. Thus the lower chord of each course of bricks grows more rapidly than the top chord so that there is a tendency for the supporting block 27 to rotate about an axis disposed vertically with respect to the sectional view shown in Fig. 1. This supporting block 27 may be referred to as a backing brick or more specifically to a skew back brick in the case of the arched roof construction shown in Fig. 1. Because of this tendency to rotate the skew back or backing brick 27 is suspended in a manner to rotate about its upper position in the manner of a swinging pendulum. This tendency to rotate also explains the pivot connection 45 between the threaded shaft 39 and the attaching member 40.

I claim:

1. Yielding means for exerting pressure on the bricks of a furnace arch through a supporting block for said arch at one end thereof, comprising a pivotally supported frame member adapted to engage said block and backing means for said frame member including a shaft, means pivotally connecting said shaft at one end to said frame member, said shaft being rotatably mounted in said means and projecting outwardly therefrom, a fixed abutment disposed at the other end of the shaft, the shaft being movable with respect to the abutment in a direction lengthwise of the shaft, a movable plate threaded onto the shaft and spaced from the abutment, means engaging said plate to hold the same aginst rotation, said plate being movable angularly relative to said abutment, and a spring interposed between the movable plate and the fixed abutment and mounted on the shaft, the shaft being rotatable in the plate to effect adjustment of the spacing of the movable plate with respect to the abutment so as to vary the compression of the spring.

2. Yielding means for exerting pressure on the bricks of a furnace arch through a supporting block for said arch at one end thereof, comprising a swingingly suspended frame member adapted to engage said block and backing means for said frame member including a shaft, a member pivotally connecting said shaft at one end thereof with said frame member, said shaft being rotatably mounted in said pivotal connecting member and projecting outwardly therefrom, a fixed abutment disposed at the other end of the shaft, the shaft being movable with respect to the abutment in a direction lengthwise of the shaft and angularly relative to said abutment, a movable plate threaded onto the shaft and spaced from the abutment, means engaging said plate to hold the same against rotation, said plate being movable angularly relative to said abutment, and a spring interposed between the movable plate and the fixed abutment and mounted on the shaft, the shaft being rotatable in the plate to effect adjustment of the spacing of the movable plate with respect to the abutment so as to vary the compression of the spring.

3. Yielding means for exerting pressure on the bricks of a furnace arch through a supporting block for said arch at one end thereof, comprising a pivotally supported frame member adapted to engage said block and backing means for said frame member including a shaft, a member pivotally connecting said shaft at one end thereof with said frame member, said shaft being rotatably mounted in said pivotal connecting member and projecting outwardly therefrom, a fixed abutment disposed at the other end of the shaft, said fixed abutment having an opening therethrough loosely receiving said shaft, the shaft being movable with respect to the abutment in a direction lengthwise of the shaft, a movable plate threaded onto the shaft and spaced from the abutment, said plate having a slot therein, a guide member engaging in said slot to hold said plate against rotation, said plate being angularly movable relative to said guide member, and a spring interposed between the movable plate and the fixed abutment and mounted on the shaft, the shaft being rotatable in the plate to effect adjustment of the spacing of the movable plate with respect to the abutment so as to vary the compression of the spring.

4. Yielding means for exerting pressure on the bricks of a furnace arch through a supporting block for said arch at one end thereof, comprising a swingingly suspended frame member adapted to engage said block and backing means for said frame member including a shaft, a member pivotally connecting said shaft at one end thereof with said frame member, said shaft being rotatably mounted in said pivotal connecting member and projecting outwardly therefrom, a fixed abutment disposed at the other end of the shaft, a spring seat mounted for rocking movement on said fixed abutment, said fixed abutment having an opening therethrough loosely receiving said shaft, the shaft being movable with respect to the abutment in a direction lengthwise of the shaft, a movable plate threaded onto the shaft and spaced from the abutment, means engaging said plate to hold the same against rotation, and a spring interposed between the movable plate and the fixed abutment and mounted on the shaft, the shaft being rotatable in the plate to effect adjustment of the spacing of the movable plate with respect to the abutment so as to vary the compression of the spring, said plate being movable angularly relative to said abutment to permit said shaft to swing about its pivotal mounting.

CHARLES F. POLLEN.

References Cited in the file of this patent

UNITED STATES PATENTS

| Number | Name | Date |
|---|---|---|
| 1,571,561 | Stevens | Feb. 2, 1926 |
| 1,601,485 | Abbott | Sept. 28, 1926 |
| 1,738,527 | Dobie | Dec. 10, 1929 |
| 1,781,724 | Fusgen | Nov. 18, 1930 |
| 2,200,372 | Linder | May 14, 1940 |
| 2,304,170 | Heuer | Dec. 8, 1942 |
| 2,372,214 | Loepsinger | Mar. 27, 1945 |